United States Patent Office.

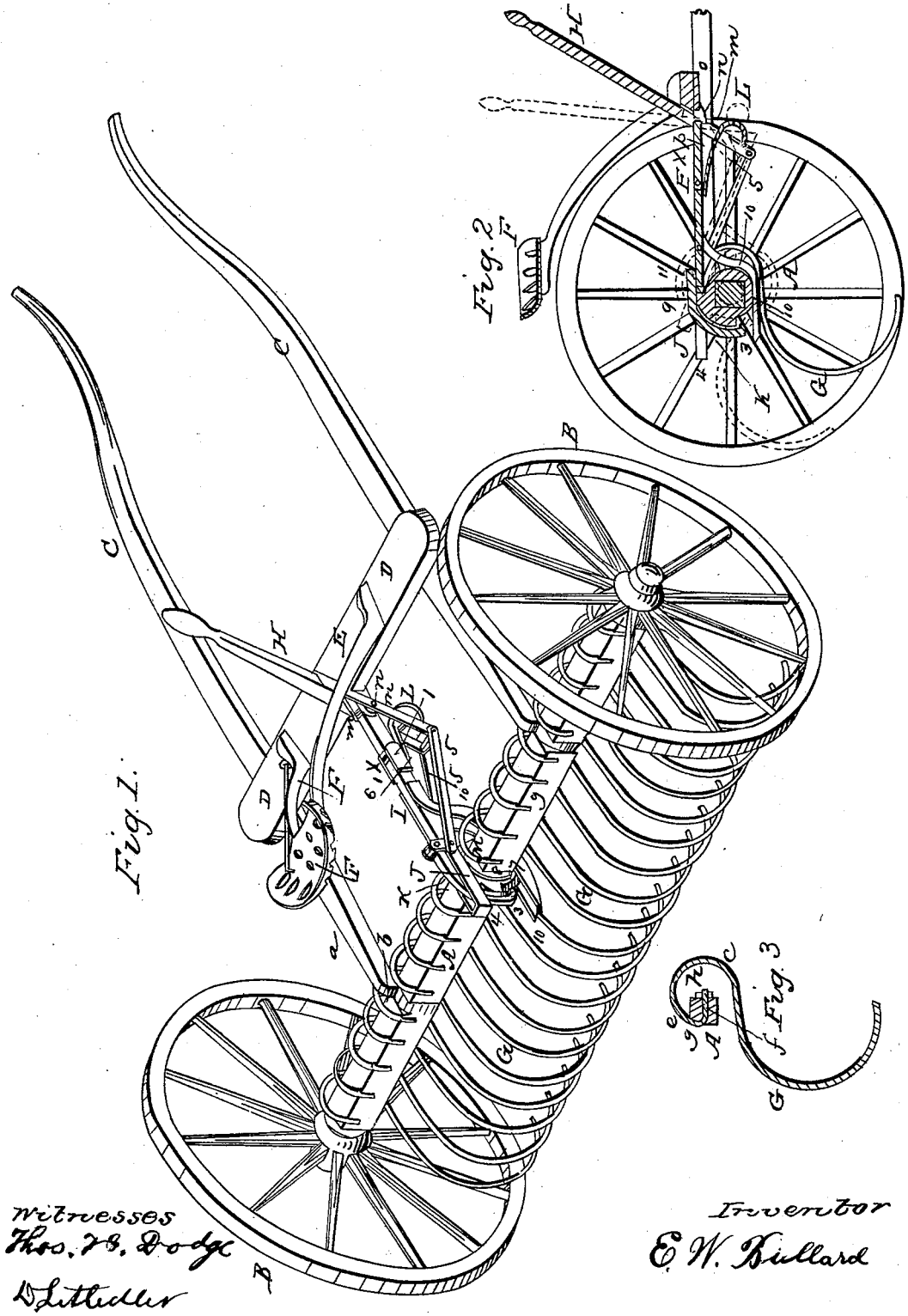

E. W. BULLARD, OF BARRE, MASSACHUSETTS, ASSIGNOR TO HIMSELF AND J. W. JENKINS, JR., OF THE SAME PLACE.

*Letters Patent No. 68,283, dated August 27, 1867.*

IMPROVEMENT IN HORSE-RAKES.

*The Schedule referred to in these Letters Patent and making part of the same.*

KNOW ALL MEN BY THESE PRESENTS:

That I, E. W. BULLARD, of Barre, in the county of Worcester, and Commonwealth of Massachusetts, have invented certain new and useful Improvements in Horse-Rakes; and I do hereby declare that the following is a full, clear, and exact description of the same, reference being had to the accompanying drawings, forming a part of this specification, in which—

Figure 1 represents a perspective view of my improved rake.

Figure 2 represents a longitudinal central section through the elevating and rake-head revolving apparatus; and Figure 3 represents a cross-section through the rake-head, and a longitudinal central section through one of the rake-teeth, showing the form of the teeth and the mode of fastening them to the rake-head.

To enable those skilled in the art to which my invention belongs to make and use the same, I will proceed to describe it.

In the drawings, the part marked A is the axle and rake-head combined, and which is supported by the wheels B B. C C are shafts, connected by cross-piece or foot-board D, to which the arms E E are fastened, which support the driver's seat F. The rear ends $a$ $a$ of the shafts C C are provided with strap-hinges $b$ $b$, which enclose the axle or rake-head A, the latter being turned down for that purpose so that the rake-head or axle can be revolved or turned freely in the strap-hinges $b$ $b$ to discharge the hay and pass the windrow when desired, as will be hereafter explained. The teeth G are made in the peculiar form shown in the drawings. By means of the curve form $c$ to the joint $d$ the hay is not only raked up, but it is compressed properly to form a compact windrow, while by making the teeth with another and reverse curve from $c$ to $e$, the proper spring of the tooth is provided for and sufficient space left between the rake-head or axle A to admit of the shank $f$ being slipped in and out of the hole in the head of the rake, and that, too, without unduly bending or springing the teeth. By this mode of construction the teeth G can be made in the proper form, as shown in fig. 3, and then easily applied to the rake-head, which is to have holes bored to receive the shanks $f$, and also be provided with notches or slots to receive the part $g$ of the teeth, so that when the nuts $h$ are screwed up the teeth will be drawn into the notches or slots, and thus prevented from twisting or turning over laterally. Another advantage of making the teeth in the form shown is, that when the teeth are revolved to discharge the hay the curved parts from $c$ to $e$ pass over the windrow very freely, without the least liability to catch and drag the hay along.

I will now describe the mode of discharging the hay or passing the windrow. H is a hand-lever, provided with forks $m$ $m$, which straddle the ears $n$ $n$, which project from a piece, $o$, fastened to the under side of the foot-board D. Between the ears $n$ $n$ is hinged the front end of arm $p$, the pivot passing through forks $m$ $m$, ears $n$ $n$, and arm $p$, as shown in the drawings. The rear end of arm $p$ is hinged between ears 1 1 on arm I, provided with ears 2 2, and a slotted guide-piece, J. Between the ears 2 2 is hinged the front end of the hook K, the rear end of which works in the slotted guide-piece J, and its rear hooked end 3 is prevented from rising higher than the rib 4, and it is not, therefore, liable to displacement. The lower ends of the forks $m$ $m$ are connected to the front of the slotted guide-piece J, on the rear of arm I, by means of the hinged arms 5 5, while one end of a spring, L, is fastened to the front edges of the forks, the other or loose end 6 being bent up and back between the forks, and allowed to bear up against the under sides of the ends of arms $p$ and I to keep the joints from breaking or falling down when the rake is in operation. A hub, M, having a square hole in it, is placed upon the axle A, so that the sides of the slotted guide-piece J will straddle the flange 7 on the hub M, and rest upon the shoulders 8 8, one being on each side of the flange 7. A holding and lifting-piece, 9, projects from the flange 7, and which piece also works between the slotted guide-piece J, which is held down upon the shoulders 8 8 upon the hub M by means of two curved forks, 10 10, which are fastened to the arm I in front of the axle A, and project down between the hinged arms 5 5, and under the axle A, so as to straddle the flange 7 and bear against the shoulders 8 8 on the hub M, as fully indicated in the drawings. The front of the holding and lifting-piece 9 is made slightly dove-tailed to fit the rear end 11 of the arm I when the rake is in operation, with the teeth in the position shown in dark lines, fig. 2, while the rear of said piece 9 is made in hook form to receive the hooked end 3 of the hook K. When the axle or rake-head A is to be revolved to discharge the hay or pass the windrow, the position of parts soon after the latter operation commences is shown in red lines, fig. 2.

The operation is as follows: When the parts are arranged as shown in fig. 1, the rake is in proper position to commence forming the windrow. After a sufficient amount of hay has been raked or gathered up by the teeth G, the driver, while sitting upon his seat F, places his foot upon one or both of the arms I and $p$, and presses down with sufficient force to "break" or cause the joint $x$ to fall below the joint or hinge of the forward end of arm $p$, at the same time taking hold of lever H and drawing it towards him with a quick motion, thereby drawing arm I and hook J forward, while the hooked end 3 of the latter catches into the notch or hook in the rear end of the holding and lifting-piece 9, and as lever H is drawn back, and arm I and hook J forward, the axle or rake-head A is caused to revolve, together with the teeth G, as indicated in red lines, fig. 2. Before lever H has been drawn quite to the extent of its back motion, the teeth G have been raised and revolved so far by turning of axle or head A that they fall forward by the force of gravity and descend in front of the axle A, their lower ends or points striking into the unraked hay just in front of the windrow. As soon as the teeth commence to fall or turn down forward of the axle A, the driver pushes lever H forward sufficiently to enable the spring L to force the joint $x$ up into the position shown in fig. 1, so that when the head A turns sufficiently to bring the teeth G into the proper position the forward end of the holding and revolving piece or projection $g$ will strike against the end 11 of arm I, as fully shown in dark lines, fig. 2, and where it will be securely held until the driver depresses joint $x$ and draws lever H back again, as above described.

It will be seen that the operation of revolving the rake-teeth to pass the windrow is very simple, while the construction and arrangement of the teeth are such that there is no liability of catching and dragging the hay. One fork or arm, 10, would be sufficient to hold the rear end of arm I and slotted guide-piece J in place, and the rake may be made with only one, if preferred.

Having described my improved horse hay-rake, what I claim therein as new and of my invention, and desire to secure by Letters Patent, is—

1. The combination, with the arms I and $p$, of the guide-piece J, hook K, and holding and revolving piece 9, substantially as and for the purposes set forth.

2. The combination, with the arm I and flanged hub M, of one or more forks, 10, substantially as and for the purposes set forth.

3. The combination, with the hook K and suitable mechanism for operating the same, of the flanged hub M, and its holding piece 9, mounted upon the axle or rake head, substantially as set forth.

4. The combination, with arms I and $p$, of lever H, with one or two forks, $m$, and one or two arms, 5, under the arrangement and for operation substantially as and for the purposes set forth.

5. The combination, with lever H and arms I and $p$, of the spring L, arranged and operating substantially as and for the purposes set forth.

6. The combination, with the axle or rake-head, of one or more rake-teeth, G, attached to the rake-head, as described, and provided each with a rear curve from $c$ to $d$, a front curve from $e$ to $c$, and a shank, $f$, substantially as and for the purposes herein shown and set forth.

E. W. BULLARD.

Witnesses:
THOS. H. DODGE,
D. L. MILLER.